United States Patent
Estes

(10) Patent No.: US 9,411,065 B2
(45) Date of Patent: Aug. 9, 2016

(54) MEASUREMENT WHILE DRILLING SPONTANEOUS POTENTIAL INDICATOR USING DIFFERENTIAL MAGNETOMETERS

(71) Applicant: Robert A. Estes, Tomball, TX (US)

(72) Inventor: Robert A. Estes, Tomball, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 144 days.

(21) Appl. No.: 14/228,831

(22) Filed: Mar. 28, 2014

(65) Prior Publication Data

US 2015/0276962 A1    Oct. 1, 2015

(51) Int. Cl.
   *G01R 33/00*    (2006.01)
   *G01V 3/08*     (2006.01)
   *G01V 3/26*     (2006.01)

(52) U.S. Cl.
   CPC . *G01V 3/08* (2013.01); *G01V 3/265* (2013.01)

(58) Field of Classification Search
   CPC ............. G01V 3/08; G01V 3/04; G01V 3/26; G01V 3/18; G01V 3/20; E21B 47/00; E21B 47/022; G01B 7/004; G01R 33/00; G01R 33/0005; G01R 33/0011
   See application file for complete search history.

(56) References Cited

U.S. PATENT DOCUMENTS

| 3,691,456 A * | 9/1972 | Warren ................... G01V 3/265 324/351 |
| 5,008,625 A * | 4/1991 | Chen ....................... G01V 3/265 324/351 |
| 7,252,144 B2 | 8/2007 | Estes et al. |
| 2010/0155139 A1* | 6/2010 | Kuckes ............. E21B 47/02216 175/45 |

* cited by examiner

*Primary Examiner* — Son Le
(74) *Attorney, Agent, or Firm* — Cantor Colburn LLP

(57) ABSTRACT

A drilling system, method and drilling apparatus for determining a parameter of a formation at a downhole location is disclosed. A member having a longitudinal axis is disposed in a borehole at the downhole location. A first magnetometer and a second magnetometer are disposed at an axial location of the member as separate azimuthal locations around the member and oriented tangential to a circumference of circle in a plane transverse to a longitudinal axis of the member. Magnetic fields resulting from a current flowing longitudinally through the member due to a spontaneous potential in the formation are measured to determine the spontaneous potential. The parameter of the formation is determined from the determined spontaneous potential.

20 Claims, 6 Drawing Sheets

MEASUREMENT WHILE DRILLING SPONTANEOUS POTENTIAL INDICATOR USING DIFFERENTIAL MAGNETOMETERS

BACKGROUND OF THE DISCLOSURE

1. Field of the Disclosure

The present disclosure relates to determining a downhole parameter of a formation and, in particular, to determining the downhole parameter using a current flowing through a drill string as a result of a spontaneous potential of the formation.

2. Description of the Related Art

Petroleum exploration involves drilling a borehole through one or more formations of the earth using a drill string with a drill bit at one end. The drill string traverses the formation as the drill bit disintegrates formation. The drill string may include conductive elements, such as a drill collar of the drill string and a wash pipe interior to the drill collar. The drill collar and wash pipe are generally electrically coupled to the formation and current may thus flow through the drill string. The magnitude of the current is generally related to a spontaneous potential that is in the formation and which is determined, in part, by various parameters of the formation.

SUMMARY OF THE DISCLOSURE

In one aspect the present invention provides a method of determining a parameter of a formation, the method including: disposing member having a longitudinal axis in a borehole at the downhole location of the formation; disposing a first magnetometer and a second magnetometer at an axial location of the member and at separate azimuthal locations around the member and oriented tangential to a circumference of circle in a plane transverse to a longitudinal axis of the member; measuring magnetic fields at the first magnetometer and the second magnetometer, the magnetic fields resulting from a current flowing through the member due to the spontaneous potential; determining the spontaneous potential from the measured magnetic field; and determining the parameter of the formation from the determined spontaneous potential.

In another aspect, the present disclosure provides a drilling apparatus, a member having a longitudinal axis; a first magnetometer and a second magnetometer disposed at an axial location of the member and at separate azimuthal locations around the member and oriented tangential to a circumference of circle in a plane transverse to the longitudinal axis of the member; and a processor configured to: obtain magnetic field measurements from the first magnetometer and the second magnetometer as a result of a current flowing through the member due to a spontaneous potential in the formation, determine the spontaneous potential from the obtained magnetic fields, and determine a parameter of the formation from the determined spontaneous potential.

In yet another aspect, the present disclosure provides a drilling system including: a drill string including a first member and a second member in an interior of the first member, wherein the second member has a longitudinal axis; a first magnetometer and a second magnetometer disposed in an annular region between the second member and the first member at an axial location of the second member, wherein the first magnetometer and the second magnetometer are at separate azimuthal locations around the second member and oriented tangential to a circumference of circle in a plane transverse to the longitudinal axis; and a processor configured to: obtain magnetic field measurements from the first magnetometer and the second magnetometer as a result of a current flowing through the second member due to a spontaneous potential in the formation, determine the spontaneous potential from the obtained magnetic fields, and determine a parameter of the formation from the spontaneous potential.

Examples of certain features of the apparatus and method disclosed herein are summarized rather broadly in order that the detailed description thereof that follows may be better understood. There are, of course, additional features of the apparatus and method disclosed hereinafter that will form the subject of the claims.

BRIEF DESCRIPTION OF THE DRAWINGS

For detailed understanding of the present disclosure, references should be made to the following detailed description, taken in conjunction with the accompanying drawings, in which like elements have been given like numerals and wherein.

DETAILED DESCRIPTION OF THE DISCLOSURE

Figure 1:
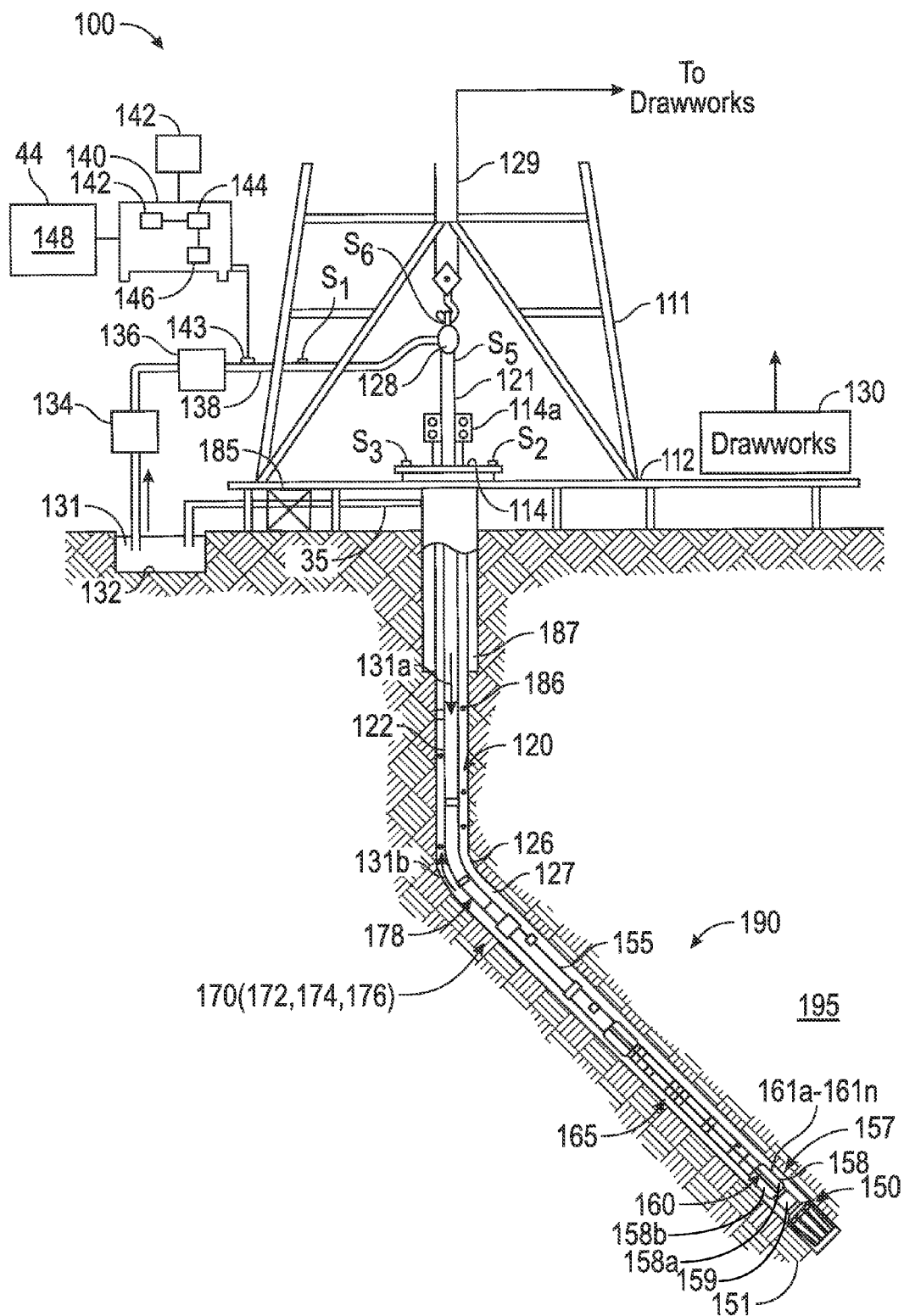
FIG. 1 is a schematic diagram of an exemplary drilling system that includes a drill string having a drilling assembly attached to its bottom end that includes a steering unit according to one embodiment of the disclosure.

FIG. 1 is a schematic diagram of an exemplary drilling system 100 that includes a drill string having a drilling assembly attached to its bottom end that includes a steering unit according to one embodiment of the disclosure. FIG. 1 shows a drill string 120 that includes a drilling assembly or bottomhole assembly ("BHA") 190 conveyed in a borehole 126. The drilling system 100 includes a conventional derrick 111 erected on a platform or floor 112 which supports a rotary table 114 that is rotated by a prime mover, such as an electric motor (not shown), at a desired rotational speed. A tubing (such as jointed drill pipe) 122, having the drilling assembly 190 attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein. In various embodiments, the drill string 120 may include a plurality of tubular members that are attached end-to-end to each other.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131*a* from the drilling tubular discharges at the borehole bottom 151 through openings in the drill bit 150. The returning drilling fluid 131*b* circulates uphole through the annular space 127 between the drill string 120 and the borehole 126 and returns to the mud pit 132 via a return line 135 and drill cutting screen 185 that removes the drill cuttings 186 from the returning drilling fluid 131*b*. A sensor $S_1$ in line 138 provides information about the fluid flow rate. A surface torque sensor $S_2$ and a sensor $S_3$ associated with the drill string 120 provide information about the torque and the rotational speed of the drill string 120. Tubing injection speed is determined from the sensor $S_5$, while the sensor $S_6$ provides the hook load of the drill string 120.

In some applications, the drill bit 150 is rotated by only rotating the drill pipe 122. However, in many other applications, a downhole motor 155 (mud motor) disposed in the drilling assembly 190 also rotates the drill bit 150. The ROP for a given BHA largely depends on the WOB or the thrust force on the drill bit 150 and its rotational speed. The mud motor 155 is coupled to the drill bit 150 via a drive shaft disposed in a bearing assembly 157. The mud motor 155 rotates the drill bit 150 when the drilling fluid 131 passes through the mud motor 155 under pressure. The bearing assembly 157, in one aspect, supports the radial and axial forces of the drill bit 150, the down-thrust of the mud motor 155 and the reactive upward loading from the applied weight-on-bit.

A surface control unit or controller 140 receives signals from the downhole sensors and devices via a sensor 143 placed in the fluid line 138 and signals from sensors $S_1$-$S_6$ and other sensors used in the system 100 and processes such signals according to programmed instructions provided from a program to the surface control unit 140. The surface control unit 140 displays desired drilling parameters and other information on a display/monitor 142 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The storage device 144 may be any non-transitory storage medium, such as ROM, RAM, EPROM, etc. The surface control unit 140 may further communicate with a remote control unit 148. The surface control unit 140 may process data relating to the drilling operations, data from the sensors and devices on the surface, data received from downhole, and may control one or more operations of the downhole and surface devices.

In addition, the BHA 190 may include a downhole computer 170. The downhole computer 170 may include a processor 172 and a storage device 174, which may be a non-transitory storage medium such as solid-state memory, tape or hard disc. The storage device 174 may include one or more computer programs 176 in the storage device 174 that are accessible to the processor 172 for executing instructions contained in such programs. The methods disclosed herein may be performed at the downhole processor 172, the surface processor 142 or in a combination of the downhole processor 172 and the surface processor 142.

The BHA 190 may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, properties or characteristics of the fluids downhole and determine other selected properties of the formation 195 surrounding the drilling assembly 190. Such sensors are generally known in the art and for convenience are generally denoted herein by numeral 165. The drilling assembly 190 may further include a variety of other sensors and devices 159 for determining one or more properties of the BHA (such as vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc. For convenience, all such sensors are denoted by numeral 159. In one embodiment, the drilling assembly 190 may include one or more magnetometers 198 that may be used to determine a magnetic field downhole that results from a spontaneous potential between layers of the earth formation an thereby to determine the spontaneous potential and downhole formation parameters. Details of the one or more magnetometers are discussed below with respect to FIG. 2.

The drilling assembly 190 includes a steering apparatus or tool 158 for steering the drill bit 150 along a desired drilling path. In one aspect, the steering apparatus may include a steering unit 160, having a number of force application members 161*a*-161*n*, each such force application unit operated by drive unit or tool made according to one embodiment of the disclosure. A drive unit is used to operate or move each force application member. A variety of wireline tools (not shown) used for logging well parameters subsequent to drilling include formation testing tools that utilize drive units to move a particular device of interest.

Figure 2:
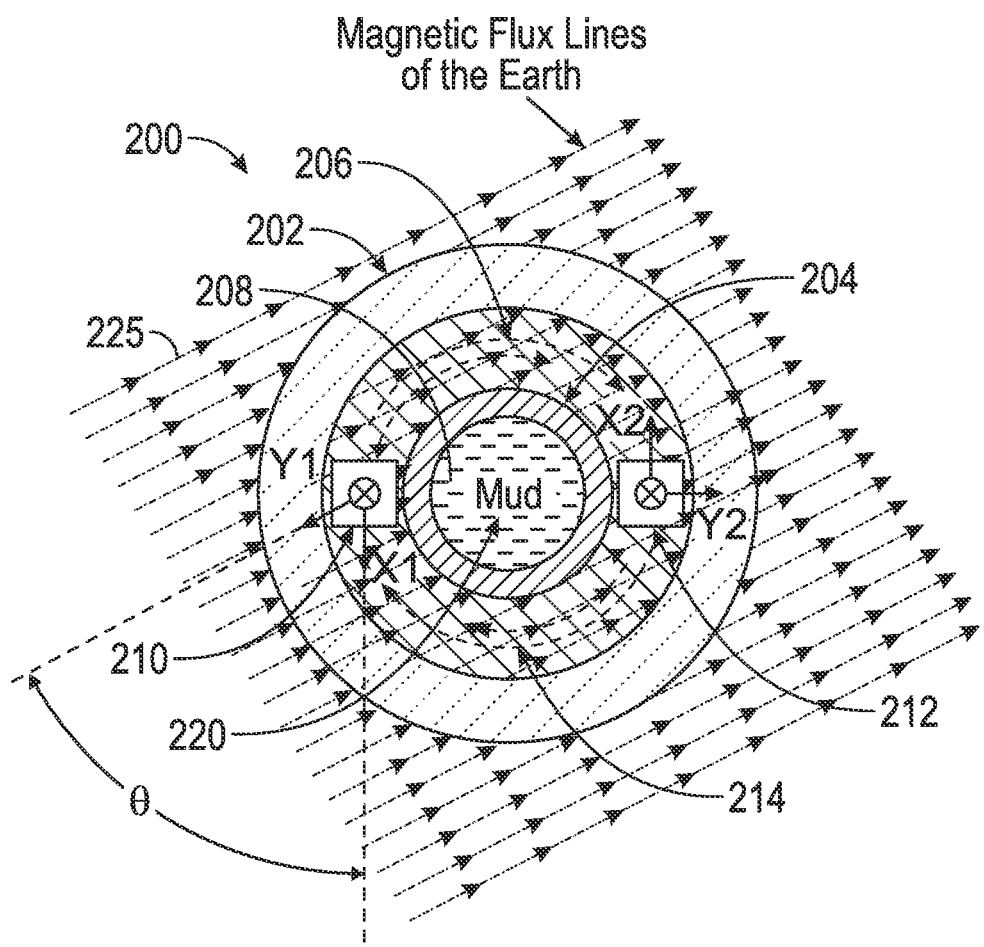
FIG. 2 shows a cross-sectional view of the drilling assembly as viewed from above looking along a longitudinal axis of the drilling assembly.

FIG. 2 shows a cross-sectional view 200 of the BHA 190 as viewed from above looking along a longitudinal axis 220 of the BHA 190. The cross-section view 200 shows various instruments of the BHA 190 that may be used to determine the spontaneous potential of the formation. The BHA 190 includes a first member 202 having a first longitudinal axis 220. In various embodiments, the first member 202 may be a tubular member such as a drill collar which is typically made of stainless steel or suitable non-magnetic steel. The BHA 190 may further include a second member 204 having a second longitudinal axis. The first longitudinal axis and the second longitudinal axis may share the same space, i.e., the first member 202 and the second member 204 are co-axial. In one embodiment, the second member 204 may be tubular member such as a wash pipe that is generally made of an electrically conductive material, such as Copper-Beryllium. Thus, in various embodiments, the second member 204 is more conductive than the first member 202. Drilling mud 208 may be pumped through an interior of the second member 204 for drilling purposes The first member 202 and the second member 204 define the annular region 206 within which are disposed a first magnetometer 210 and a second magnetometer 212. In one embodiment, the first magnetometer 210 and the second magnetometer 212 are diametrically opposed to each other (i.e., 180° apart) with respect to the first longitudinal axis 220. However, the method may be performed using magnetometers that are not diametrically opposed, given that the angular relation between the first magnetometer 210 and the second magnetometer 212 is known. The first magnetometer 210 is radially offset from the longitudinal axis 220 at a radial distance that is substantially the same as a radial offset of the second magnetometer 212 from the longitudinal axis 220. The first magnetometer 210 includes a magnetometer oriented tangentially to a circumference of a circle centered on the longitudinal axis 220 and in a plane transverse to the longitudinal axis 220 (i.e., along an $x_1$-direction as shown in FIG. 2). Similarly, the second magnetometer 212 includes a magnetometer oriented tangentially to the circumference of the circle and in the plane transverse to the longitudinal axis 220 (i.e., along the $x_2$-direction) and thus is oriented anti-parallel to the first magnetometer 210. Thus, both of the first and second magnetometers 210 and 212 are oriented along either a clockwise direction or a counter-clockwise direction around the second member 204. The first magnetometer 210 and the second magnetometer 212 are therefore sensitive to a magnetic field 214 (or magnetic field components) in either the clockwise or counter-clockwise directions. In the illustrative embodiment of FIG. 2, the first and second magnetometers 210 and 212 are oriented along a counter-clockwise direction. In various embodiments, at least one of the first magnetometer 210 and the second magnetometer 212 may be a component of a triaxial magnetometer that has magnetometer components aligned orthogonally to each other. For example, the first magnetometer 210 includes a tangentially-directed magnetometer (X1) and a radially-directed magnetometer (Y1). Similarly, the second magnetometer 212 includes a tangentially-directed magnetometer (X2) and a radially-directed magnetometer (Y2).

In general, the second member 204 is not electrically insulated from the first member 206 at ends of the BHA 190. Thus, the second member 204 is electrically coupled to the formation, and a spontaneous potential between formation layers will generate a current in the second member 204. The generated current creates the magnetic field 214 which is detected at the first magnetometer 210 and the second magnetometer 212. Therefore, magnetic measurements may be used to determined spontaneous potential as well as downhole formation parameters that affect the spontaneous potential. A magnetic field of the earth ($B_{earth}$) is shown as magnetic field lines 225. Each of the first magnetometer 210 and the second magnetometer 212 are responsive to both the magnetic field 214 and the earth's magnetic field 225. The earth's magnetic field lines 225 penetrate the first member 202, the second member 204 and any mud inside the second member 204 and/or in the annular region 206. The combined effect of the earth's magnetic field 225 and the spontaneous potential magnetic field 214 are measured at both the first magnetometer 210 and the second magnetometer 212.

The present disclosure determines the magnetic field 214 of the spontaneous potential through use of Equations (1)-(4) and the measurement of the first magnetometer 210 and the second magnetometer 212. The radial component of the first magnetometer is 210 at an angle θ with respect to the earth's magnetic field 225. The angle θ may be a toolface angle. Therefore, the total magnetic field measured at the first magnetometer (tangential direction) is:

$$M_{X1} = B_{SP} + B_{earth} \cos\theta \qquad \text{Eq. (1)}$$

where $M_{X1}$ is the measured magnetic field at the tangentially directed first magnetometer 210, $B_{SP}$ is the magnetic field 214 resulting from the spontaneous potential and $B_{earth}$ is the earth's magnetic field 225. Similarly, the total magnetic field measured at the second magnetometer 212 is:

$$M_{X2} = B_{SP} - B_{earth} \cos\theta \qquad \text{Eq. (2)}$$

where $M_{X2}$ is the total magnetic field measured by the tangentially directed magnetometer 212. The contribution of the earth magnetic field to $M_{X2}$ in Eq. (2) is opposite its contribution to $M_{X1}$ in Eq. (1). From Eqs. (1) and (2), it can be seen that $$B_{SP} = \tfrac{1}{2}(M_{X1} + M_{X2}) = \tfrac{1}{2}(B_{SP} + B_{earth}\cos\theta + B_{SP} - B_{earth}\cos\theta) \qquad \text{Eq. (3)}$$

and that $$B_{earth\_X} = \tfrac{1}{2}(M_{X1} - M_{X2}) = \tfrac{1}{2}(B_{SP} + B_{earth}\cos\theta - B_{SP} + B_{earth}\cos\theta) = B_{SP} - \tfrac{1}{2}(M_{X1} + M_{X2}) = B_{earth}\cos\theta \qquad \text{Eq. (4)}$$

where $B_{earth\_X}$ is the component of the earth's magnetic field along the tangentially-directed magnetometer directions. Eq. (3) shows that the determination of the magnetic field 214 resulting from the spontaneous potential is independent of angle θ.

It may also be shown (Eqs. (5)-(7)) that a measurement of the radial component of the earth's magnetic field may be determined and that such measurements are unaffected by minor misalignment errors with respect to the radially-oriented components Y1 and Y2. The measured magnetic field in the radial direction at the first magnetometer 210 is:

$$M_{Y1} = kB_{SP} + B_{earth}\sin\theta \qquad \text{Eq. (5)}$$

where k represents the misalignment error. Similarly, the measured magnetic field in the radial direction at the second magnetometer 212 is:

$$M_{Y2} = kB_{SP} - B_{earth}\sin\theta \qquad \text{Eq. (6)}$$

The component of the earth's magnetic field with respect to Y1 and Y2 can thus be determined by $$B_{earth\_Y} = \tfrac{1}{2}(M_{Y1} - M_{Y2}) = \tfrac{1}{2}(kB_{SP} + B_{earth}\sin\theta - kB_{SP} + B_{earth}\sin\theta) = B_{earth}\sin\theta \qquad \text{Eq. (7)}$$

The misalignment error (k) is absent from Eq. (7). Therefore, misalignment errors of Y1 and Y2 do not affect the determined value of $B_{earth\_Y}$.

Figure 3:
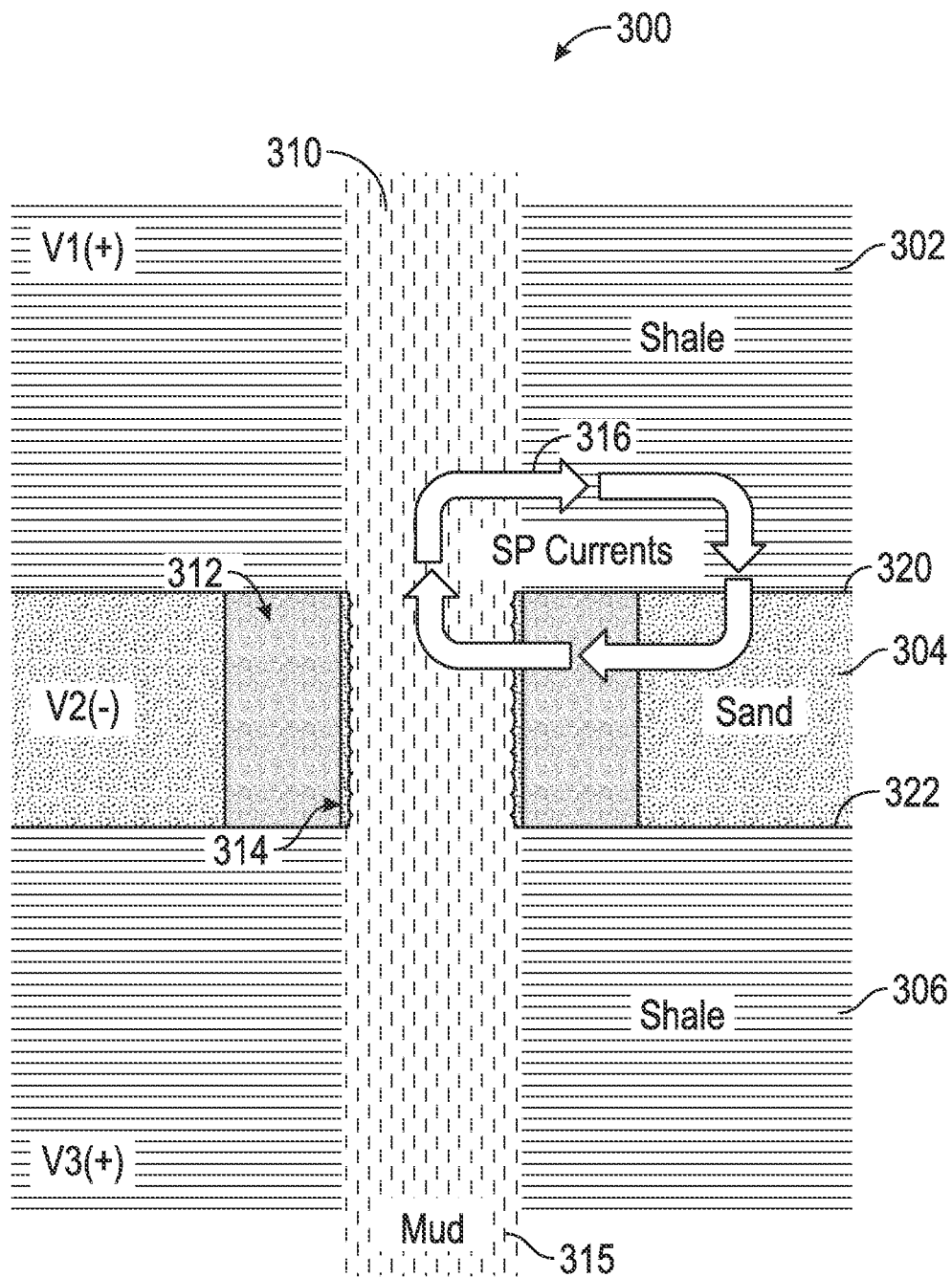
FIG. 3 shows a cross-section of a formation having a spontaneous potential.

FIG. 3 shows a cross-section 300 of a formation having a spontaneous potential. A spontaneous potential is a potential difference between layers of an earth formation. The formation 300 includes a top layer 302 of shale, a bottom layer 306 of shale, and a reservoir 304 sandwiched between the top layer 302 and the bottom layer 306. The reservoir 304 may include a sand layer. The top layer 302 has a first potential V1 (e.g., a positive potential). The reservoir 304 has a second potential V2 (e.g., a negative potential) and the bottom layer 306 has a third potential V3 (e.g., a positive potential). In general, the first potential and the third potential have different potential values. A borehole 310 penetrates the top layer 304, the reservoir 304 and the bottom layer 306. Mud 315 resides in the borehole 310. The reservoir 304 includes an invaded zone 312 in which drilling mud used during drilling of the borehole has diffused into the sand reservoir 304 to a selected length. Mud cake 314 is formed at the sand reservoir 304 along a wall of the borehole 310 during the drilling process.

The potential difference between V1 and V2 generates a spontaneous potential in the earth formation that generates a current flow across the interface 320 between the top layer 302 and the reservoir 304. Eddy currents 316 resulting from the spontaneous potential between the potentials V1 and V2 is shown for illustrative purposes. Similarly, the potential difference between V3 and V2 creates a spontaneous potential in the earth formation that generates a current flow across the interface 322 between the bottom layer 304 and the reservoir 306.

Spontaneous potential may include at least two components. A first component is an electrochemical component, which is a result of voltage potential built up between the various layers of the earth formation over a geologic time frame, such as millions of years. Current resulting from the electrochemical component is due to an ionic flow between the layered structures due to the presence of the borehole 310. A second component is an electrokinetic component. The electrokinetic component originates from the flow of electrolytes such as mud 315 over the charged layers of the earth formation.

Drilling the borehole 310 through the layers 302, 304 and 306 interrupts the isolation of these layers 302, 304 and 306 and establishes a path for current to flow through the conductive mud 315 in the borehole 310. During drilling, when the formation has been freshly cut by the drill bit, and mud cake has not yet had time to form, the electrokinetic component is significant. Additionally, when drilling with sea water, there may be no mud cake at all. Therefore the electrokinetic component may predominate at a location just behind the drill bit when thin conductive drilling muds are used. Various parameters of the formation, such as pore pressure in selected formation layers, permeability, mud cake and mud viscosity affect how much these components contribute to the spontaneous potential.

Figure 4:
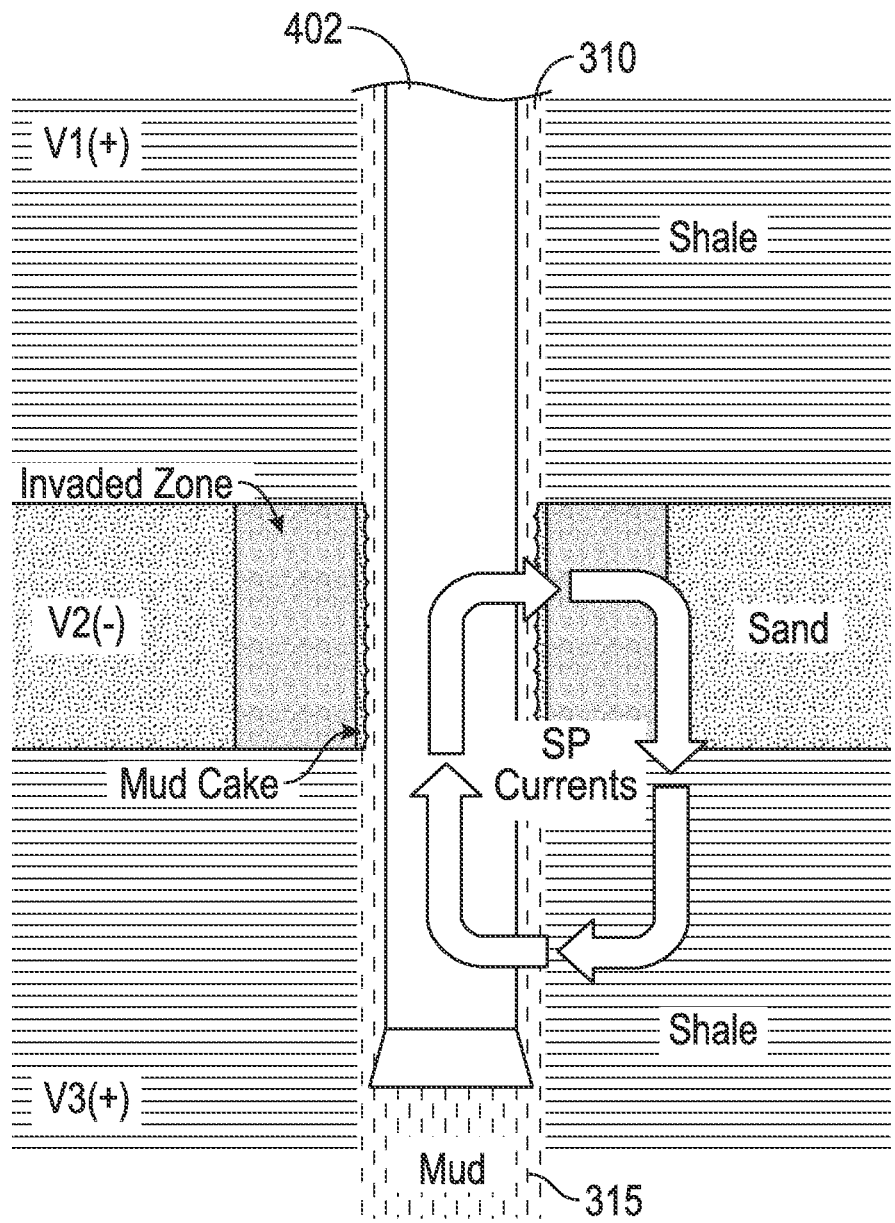
FIG. 4 shows a drill string disposed in a borehole in the formation of FIG. 3.

FIG. 4 shows a drill string 402 disposed in the borehole of FIG. 3. The drill string 402 represents a fully conductive short-circuit between layers 302, 304 and 306. The drill string 402 and, in particular, the second member (204, FIG. 2) of the drill string 402 provides a conductive path for current flow that is more conductive than the mud 315 in the borehole 310. Due to the length of the drill string 402, the drill string 402 conducts currents away from the reservoir 304. A majority of the current resulting from spontaneous potential flows through the drill string 402 and not through the mud 315. In particular, a majority of the current flows through the second member (204, FIG. 2) of the drill string 402.

Referring back to FIG. 2, in one embodiment, the magnetometers 210 and 212 may be used to determine a spontaneous potential in an earth formation due to a current that flows through the second member 204 as a result of the spontaneous potential. The current flowing in the second member 204 generates a circumferential magnetic field 214 in the annular region 206 between the second member 204 and the first member 202. As previously discussed, the first magnetometer 210 and the second magnetometer 212 are oriented so as to be sensitive to the circumferential magnetic field 214. The direction of the magnetic field (i.e., clockwise vs. counter-clockwise) is related to the direction of flow of the current in the second member 204. Current flowing in one direction (e.g., a downward direction) generates a clockwise magnetic field in the annular region 206, as shown in FIG. 2. The first magnetometer 210 measures a magnetic field from the clockwise tangential magnetic field 214 as well as from the earth. Similarly, the second magnetometer 212 measures a magnetic field measurement from the clockwise tangential magnetic field 214 as well as from the earth. A sum of these magnetic field measurements is proportional to a magnitude of the current flowing in the second member 204. A difference between the magnetic field measurements at the first magnetometer 210 and the second magnetometer 212 is proportional to an external magnetic field vector component in the $x_1$-direction.

Figure 5A:
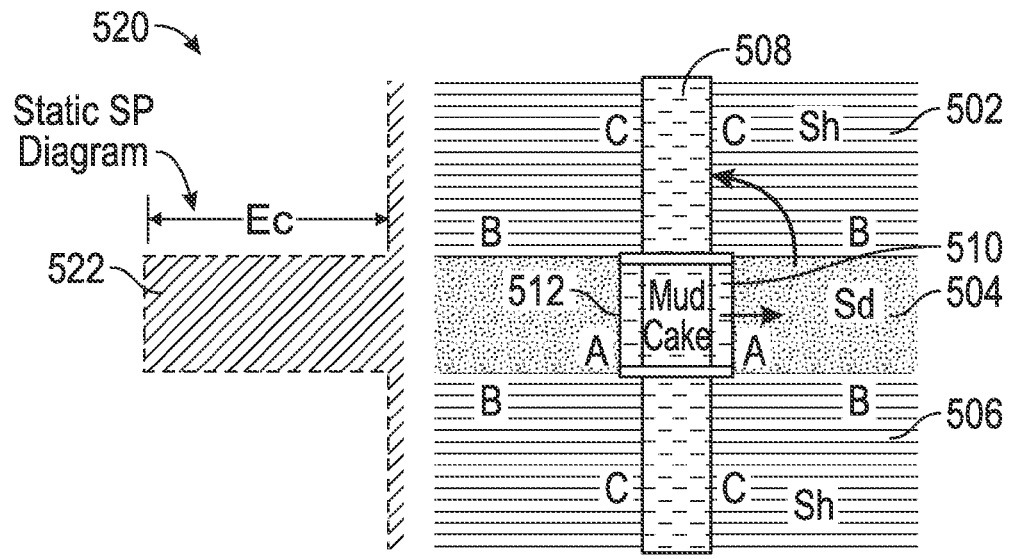
FIGS. 5A-5C shows various spontaneous potential curves related to different downhole conditions.
Figure 5B:
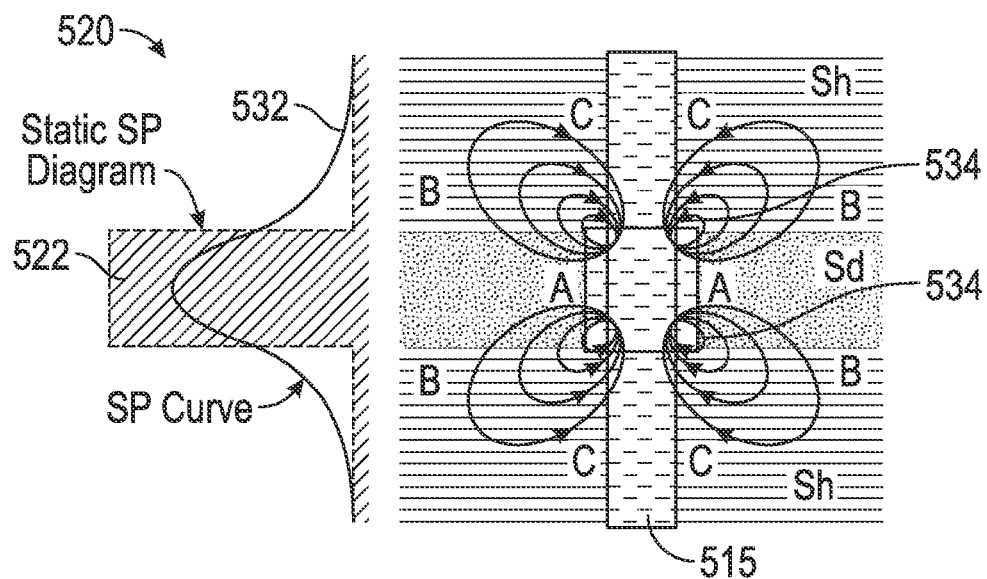
Figure 5C:
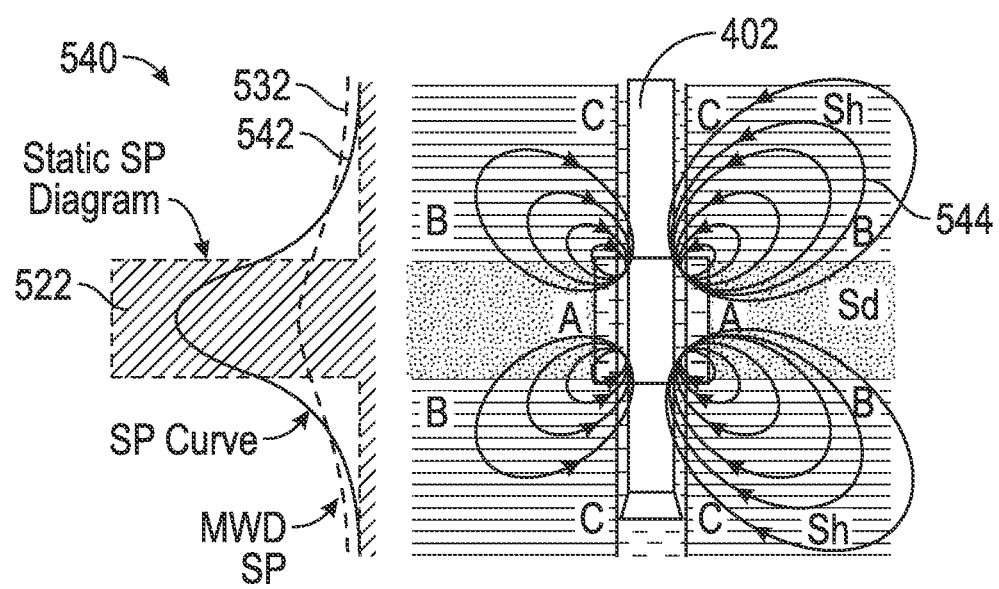

FIGS. 5A-5C shows various spontaneous potential curves related to different downhole conditions. FIG. 5A shows a top formation layer 502, a middle formation layer 504 and a bottom formation layer 506, each penetrated by a borehole 508. Mud cake 510 has built up along the walls of the borehole 510 and a mud invasion zone 512 permeates the middle formation layer 504. The mud cake 510 essentially forms an insulating plug that prevents or reduces an amount of current flow between the layers 502, 504 and 506. A potential diagram 520 to the left of the formation layers 502, 504 and 506 illustrates a resulting potential 522 under the condition shown in FIG. 5A. The potential 522 varies between a first potential for top layer 502, a second potential for reservoir 504 and a third potential for bottom layer 506. For illustrative purposes, the first and third potentials are substantially the same. The change in the potentials is abrupt at the interface between the top layer 502 and the reservoir 504 and the interface between the reservoir 504 and the bottom layer 506.

FIG. 5B shows the earth formation of FIG. 5A with current flowing through mud 515 in borehole 508 due to the spontaneous potential. Diagram 530 to the left of the formations 502, 504 and 506 show potential measurements that may be obtained using the exemplary apparatus discloses herein. The potential curve 522 from FIG. 5A is shown. A potential curve 532 is shown that may be obtained when eddy currents 534 generated by the spontaneous potential are flowing in the mud 515. The amplitude of the potential curve 532 is less than the amplitude of the potential curve 522. Additionally, the potential curve 532 is a smooth curve, without the discontinuities shown in potential curve 522.

FIG. 5C show the earth formation of FIG. 5A with eddy currents flowing through a drill string due to the spontaneous potential. A diagram 540 is shown of measured potential when eddy currents 544 are flowing through a drill string 402. The magnitude of the current 544 is greater than the magnitude of current 534 due to the presence of the drill string 402. The spontaneous potential 542 in the presence of the drill string 402 is shown The amplitude of the potential curve 542 (drill string) is less than the amplitude of the potential curve 532 (mud). The amplitude of the potential curves 542 and 532 may be affected by various downhole parameters, such as the resistivity of the formation, the pore pressure of the formations, the permeability of the formation, etc. Thus, the amplitude of the potential curves may be measured and used to determine differences in these downhole parameters between the formations. The methods discloses herein may therefore determine a relative difference in the selected parameter or a change in depth of the parameter.

In various embodiments, the magnetic measurements may be used to indicate spontaneous potential of the formation. The spontaneous potential or measured change in the spontaneous potential may be used to determine a parameter of the formation, such as resistivity, difference in permeability between formations, difference in porosity between formations, etc. In additional embodiments, a change in the magnetic measurements may be used to determine various downhole conditions, such as an influx of hydrocarbons into the wellbore (e.g., kick), an increase in influx of mud into a formation, etc.

While the apparatus disclosed herein is described with respect to two opposing magnetometers, in alternate embodiments, multiple magnetometers may be deployed around the second member. In addition, opposing magnetometers pairs may be disposed at different axial locations along the drill string. Magnetometers may be deployed in hatches on opposite sides of a drill collar. To concentrate the electrical current in the center of the drill string, the second member may be deployed on an inner wall of the drill collar. The magnetometer measurements may be corrected for current flow and for residual biases seen in dynamic rotation of the drill string.

Therefore, in one aspect the present invention provides a method of determining a parameter of a formation, the method including: disposing member having a longitudinal axis in a borehole at the downhole location of the formation; disposing a first magnetometer and a second magnetometer at an axial location of the member and at separate azimuthal locations around the member and oriented tangential to a circumference of circle in a plane transverse to a longitudinal axis of the member; measuring magnetic fields at the first magnetometer and the second magnetometer, the magnetic fields resulting from a current flowing through the member due to the spontaneous potential; determining the spontaneous potential from the measured magnetic field; and determining the parameter of the formation from the determined spontaneous potential. The parameter of the formation may be determined from a change in the parameter of the formation as the first magnetometer and the second magnetometer pass from one formation layer to another formation layer. At least one of the first magnetometer and the second magnetometer may be part of a tri-axial magnetometer. Determining the spontaneous potential may further include determining at least one of an electrochemical component of the spontaneous potential and an electrokinetic component of the spontaneous potential. The parameter of the formation may be selected from a group consisting of: (i) a presence of an invaded zone; (ii) a presence of mud cake; (iii) a resistivity of the formation; (iv) a relative permeability between formation layers; (v) a relative porosity between formation layers; (vi) an influx of mud into the formation; (vii) an influx of fluid into the borehole; and (viii) a parameter that affects the spontaneous potential. In one embodiment, the first magnetometer and the second magnetometer are diametrically opposed to each other. In various embodiments, the member may be part of at least one of: (i) a drill string, (ii) a drill collar of a measurement-while-drilling tool.

In another aspect, the present disclosure provides a drilling apparatus, a member having a longitudinal axis; a first magnetometer and a second magnetometer disposed at an axial location of the member and at separate azimuthal locations around the member and oriented tangential to a circumference of circle in a plane transverse to the longitudinal axis of the member; and a processor configured to: obtain magnetic field measurements from the first magnetometer and the second magnetometer as a result of a current flowing through the member due to a spontaneous potential in the formation, determine the spontaneous potential from the obtained magnetic fields, and determine a parameter of the formation from the determined spontaneous potential. The processor may be further configured to determine a change in the parameter of the formation as the first magnetometer and the second magnetometer pass from one formation layer to another formation layer. At least one of the first magnetometer and the second magnetometer may be a part of a tri-axial magnetometer. The processor may be further configured to determine from the magnetic fields at least one of (i) an electrochemical component of the spontaneous potential; and (ii) an electrokinetic component of the spontaneous potential. In various embodiments, the parameter of the formation may be at least one of: (i) a presence of an invaded zone; (ii) a presence of mud cake; (iii) a resistivity of the formation; (iv) a relative permeability between formation layers; (v) a relative porosity between formation layers; (vi) an influx of mud into the formation; (vii) a influx of fluid into the borehole; and (viii) a parameter that affects the spontaneous potential. In various embodiments, the member is in an interior of another member and a conductivity of the member is greater than a conductivity of the other member. The member may be part of at least one of: (i) a drill string, (ii) a drill collar of a measurement-while-drilling tool.

In yet another aspect, the present disclosure provides a drilling system including: a drill string including a first member and a second member in an interior of the first member, wherein the second member has a longitudinal axis; a first magnetometer and a second magnetometer disposed in an annular region between the second member and the first member at an axial location of the second member, wherein the first magnetometer and the second magnetometer are at separate azimuthal locations around the second member and oriented tangential to a circumference of circle in a plane transverse to the longitudinal axis; and a processor configured to: obtain magnetic field measurements from the first magnetometer and the second magnetometer as a result of a current flowing through the second member due to a spontaneous potential in the formation, determine the spontaneous potential from the obtained magnetic fields, and determine a parameter of the formation from the spontaneous potential. The processor may be further configured to determine a change in the parameter of the formation as the first magnetometer and the second magnetometer pass from one formation layer to another formation layer. At least one of the first magnetometer and the second magnetometer may be part of a tri-axial magnetometer. The processor may be further configured to determine from the magnetic fields at least one of (i) an electrochemical component of the spontaneous potential; and (ii) an electrokinetic component of the spontaneous potential. In various embodiments, the parameter of the formation is selected from a group consisting of: (i) a presence of an invaded zone; (ii) a presence of mud cake; (iii) a resistivity of the formation; (iv) a relative permeability between formation layers; (v) a relative porosity between formation layers; (vi) an influx of mud into the formation; (vii) a influx of fluid into the borehole; and (viii) a parameter of the formation that affects the spontaneous potential. A conductivity of the second member is generally greater than a conductivity of the first member.

While the foregoing disclosure is directed to the certain exemplary embodiments of the disclosure, various modifications will be apparent to those skilled in the art. It is intended that all variations within the scope and spirit of the appended claims be embraced by the foregoing disclosure.

What is claimed is:

1. A method of determining a parameter of a formation, comprising:
    disposing member having a longitudinal axis in a borehole at the downhole location of the formation;
    disposing a first magnetometer and a second magnetometer at an axial location of the member and at separate azimuthal locations around the member and oriented tangential to a circumference of circle in a plane transverse to a longitudinal axis of the member;
    measuring a first magnetic field at the first magnetometer that is a combination of a magnetic field resulting from a current flowing through the member due to the spontaneous potential and a component of the earth's magnetic field;
    measuring a second magnetic field at the second magnetometer that is a difference between the magnetic field resulting from the current flowing through the member due to the spontaneous potential and the component of the earth's magnetic field;
    calculating the spontaneous potential from the first magnetic field and the second magnetic field; and
    determining the parameter of the formation from the spontaneous potential.

2. The method of claim 1, further comprising determining the parameter of the formation from a change in the parameter of the formation as the first magnetometer and the second magnetometer pass from one formation layer to another formation layer.

3. The method of claim 1, wherein at least one of the first magnetometer and the second magnetometer is a part of a tri-axial magnetometer.

4. The method of claim 1, wherein determining the spontaneous potential further comprises determining at least one of: (i) an electrochemical component of the spontaneous potential; and (ii) an electrokinetic component of the spontaneous potential.

5. The method of claim 1, wherein the parameter of the formation is selected from a group consisting of: (i) a presence of an invaded zone; (ii) a presence of mud cake; (iii) a resistivity of the formation; (iv) a relative permeability between formation layers; (v) a relative porosity between formation layers; (vi) an influx of mud into the formation; (vii) an influx of fluid into the borehole; and (viii) a parameter that affects the spontaneous potential.

6. The method of claim 1, wherein the first magnetometer and the second magnetometer are diametrically opposed to each other.

7. The method of claim 1, wherein the member is part of at least one of: (i) a drill string, and (ii) a drill collar of a measurement-while-drilling tool.

8. A drilling apparatus, comprising:
a member having a longitudinal axis;
a first magnetometer and a second magnetometer disposed at an axial location of the member and at separate azimuthal locations around the member and oriented tangential to a circumference of circle in a plane transverse to the longitudinal axis of the member; and
a processor configured to:
obtain a first magnetic field measurement from the first magnetometer that is a combination of a magnetic field resulting from a current flowing through the member due to a spontaneous potential in the formation and a component of the earth's magnetic field,
obtain a second magnetic field measurement from the second magnetometer that is a difference between the magnetic field resulting from a current flowing through the member due to the spontaneous potential in the formation and the component of the earth's magnetic field;
calculate the spontaneous potential from the obtained first magnetic field and second magnetic field, and
determine a parameter of the formation from the determined spontaneous potential.

9. The drilling apparatus of claim 8, wherein the processor is further configured to determine a change in the parameter of the formation as the first magnetometer and the second magnetometer pass from one formation layer to another formation layer.

10. The drilling apparatus of claim 8, wherein at least one of the first magnetometer and the second magnetometer is a part of a tri-axial magnetometer.

11. The drilling apparatus of claim 8, wherein the processor is further configured to determine from the first and second magnetic fields at least one of (i) an electrochemical component of the spontaneous potential; and (ii) an electrokinetic component of the spontaneous potential.

12. The drilling apparatus of claim 8, wherein the parameter of the formation is selected from a group consisting of: (i) a presence of an invaded zone; (ii) a presence of mud cake; (iii) a resistivity of the formation; (iv) a relative permeability between formation layers; (v) a relative porosity between formation layers; (vi) an influx of mud into the formation; (vii) a influx of fluid into the borehole; and (viii) a parameter that affects the spontaneous potential.

13. The drilling apparatus of claim 8, wherein the member is in an interior of another member, wherein a conductivity of the member is greater than a conductivity of the other member.

14. The drilling apparatus of claim 8, wherein the member is part of at least one of: (i) a drill string, (ii) a drill collar of a measurement-while-drilling tool.

15. A drilling system, comprising:
a drill string including a first member and a second member in an interior of the first member, wherein the second member has a longitudinal axis;
a first magnetometer and a second magnetometer disposed in an annular region between the second member and the first member at an axial location of the second member, wherein the first magnetometer and the second magnetometer are at separate azimuthal locations around the second member and oriented tangential to a circumference of circle in a plane transverse to the longitudinal axis; and
a processor configured to:
obtain a first magnetic field measurement from the first magnetometer that is a combination of a magnetic field resulting from a current flowing through the member due to a spontaneous potential in the formation and a component of the earth's magnetic field,
obtain a second magnetic field measurement from the second magnetometer that is a difference between the magnetic field resulting from a current flowing through the member due to the spontaneous potential in the formation and the component of the earth's magnetic field,
calculate the spontaneous potential from the obtained first magnetic field and second magnetic field, and
determine a parameter of the formation from the spontaneous potential.

16. The drilling system of claim 15, wherein the processor is further configured to determine a change in the parameter of the formation as the first magnetometer and the second magnetometer pass from one formation layer to another formation layer.

17. The drilling system of claim 15, wherein at least one of the first magnetometer and the second magnetometer is a part of a tri-axial magnetometer.

18. The drilling system of claim 15, wherein the processor is further configured to determine from the first and second magnetic fields at least one of (i) an electrochemical component of the spontaneous potential; and (ii) an electrokinetic component of the spontaneous potential.

19. The drilling system of claim 15, wherein the parameter of the formation is selected from a group consisting of: (i) a presence of an invaded zone; (ii) a presence of mud cake; (iii) a resistivity of the formation; (iv) a relative permeability between formation layers; (v) a relative porosity between formation layers; (vi) an influx of mud into the formation; (vii) a influx of fluid into the borehole; and (viii) a parameter of the formation that affects the spontaneous potential.

20. The drilling system of claim 15, wherein a conductivity of the second member is greater than a conductivity of the first member.

\* \* \* \* \*